Patented May 5, 1931

1,803,758

UNITED STATES PATENT OFFICE

RICHARD HERZ, OF FRANKFORT-ON-THE-MAIN, AND WERNER ZERWECK, OF FRANK-FORT-ON-THE-MAIN-FECHENHEIM, GERMANY, ASSIGNORS TO GENERAL ANILINE WORKS, INC., OF NEW YORK, N. Y., A CORPORATION OF DELAWARE

HALOGENATED VAT DYESTUFFS AND PROCESS OF MAKING SAME

No Drawing. Original application filed November 1, 1926, Serial No. 145,697, and in Germany November 7, 1925. Divided and this application filed December 11, 1929. Serial No. 413,420.

This application is a division of our copending application Serial No. 145,697, filed November 1, 1926.

We have found that valuable vat dyestuffs of the anthanthrone series are obtainable by causing a halogenating agent to act upon anthanthrone in the presence of an inorganic diluent selected from the group consisting of: concentrated sulfuric acid, sulfuric acid monohydrate, fuming sulfuric acid, chlorosulfonic acid, sulfuryl chloride, sulfur chlorides and thionyl chloride. The reaction can be carried out at ordinary or at elevated temperatures preferably below 100° C.

As suitable halogenating agents there may be used: bromine, chlorine gas, and for chlorinating also those compounds which evolve chlorine during the reaction as, for instance, sulfuryl chloride, antimony pentachloride, sulfur chlorides, alkali hypochlorites in the presence of an inorganic acid, and alkali chlorates in the presence of hydrochloric acid.

According to our new process, chlorine and bromine atoms may be introduced in the anthanthrone molecule by treating finely ground anthanthrone with bromine in the presence of an inorganic diluent as before-stated, and then passing chlorine into this mixture, to which a small amount of iodine, ferric chloride, antimony pentachloride, iodine-trichloride or a similar compound may be added as a halogen carrier.

The most valuable products are obtained when the chlorination and bromination are carried out in such a way that approximately one atom of chlorine and one atom of bromine enter into the molecule of the anthanthrone.

The new dyestuff, corresponding probably to the general formula:

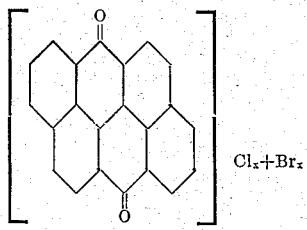

in which formula x is approximately the number 1, is when dry an orange powder, difficultly soluble in organic solvents of a higher boiling point, easily soluble in concentrated sulfuric acid with a pure green color, and dyeing vegetable fibers from a violet vat orange shades of exceptional brightness and excellent fastness.

In order to further illustrate our invention, the following example is given, the parts being by weight and all temperatures in centigrade degrees, but it is understood that our invention is not limited to the particular products or reaction condition mentioned therein:

Example 22 parts of anthanthrone are dissolved in about 200 parts of sulfuric acid monohydrate, 42 parts of fuming sulfuric acid of 65% of $SO_3$, 0.2 parts of iodine and 6 parts of bromine are added and the solution is warmed to about 60° for some hours. Then the mass is cooled down, and at ordinary temperature a current of chlorine is allowed to pass while cooling, until the increase of the weight shows that one atom of chlorine has entered into the molecule. The mass is poured on ice; the orange-red colored precipitate is filtered. The dyestuff, thus obtained, having probably the formula:

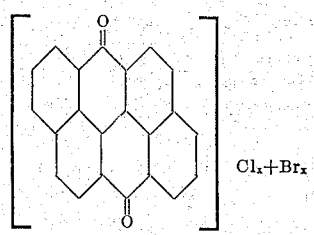

in which formula x is approximately the number 1, is when dry an orange powder, difficultly soluble in organic solvents of a higher boiling point, easily soluble in concentrated sulfuric acid with a pure green color, and dyeing vegetable fibers from a violet vat orange shades of exceptional brightness and excellent fastness.

We claim:

1. The process which comprises reacting upon anthanthrone with a brominating agent, in the presence of an inorganic diluent selected from the group consisting of concentrated sulfuric acid, sulfuric acid monohydrate, fuming sulfuric acid, chlorosulfonic acid, sulfuryl chloride, sulfur chlorides and thionyl chloride, at an elevated temperature below 100° C., and then cooling down and passing chlorine into the mixture.

2. The process which comprises reacting upon anthanthrone with a brominating agent, in the presence of an inorganic diluent selected from the group consisting of concentrated sulfuric acid, sulfuric acid monohydrate, fuming sulfuric acid, chlorosulfonic acid, sulfuryl chloride, sulfur chlorides and thionyl chloride, and of a carrier selected from the group consisting of I, $SbCl_5$, $FeCl_3$ and $ICl_3$, at an elevated temperature below 100° C., and then cooling down and passing chlorine into the mixture.

3. The process which comprises reacting upon anthanthrone with a brominating agent, in the presence of an inorganic diluent selected from the group consisting of concentrated sulfuric acid, sulfuric acid monohydrate, fuming sulfuric acid, chlorosulfonic acid, sulfuryl chloride, sulfur chlorides and thionyl chloride, at an elevated temperature below 100° C., until approximately one bromine atom has been introduced into the anthanthrone molecule, and then cooling down and passing chlorine into the mixture, until approximately one chlorine atom has been introduced into the anthanthrone molecule.

4. The process which comprises reacting upon anthanthrone with a brominating agent, in the presence of an inorganic diluent selected from the group consisting of concentrated sulfuric acid, sulfuric acid monohydrate, fuming sulfuric acid, chlorosulfonic acid, sulfuryl chloride, sulfur chlorides and thionyl chloride, and of a carrier selected from the group consisting of I, $SbCl_5$, $FeCl_3$ and $ICl_3$, at an elevated temperature below 100° C., until approximately one bromine atom has been introduced into the anthanthrone molecule, and then cooling down and passing chlorine into the mixture, until approximately one chlorine atom has been introduced into the anthanthrone molecule.

5. The process which comprises reacting upon anthanthrone with bromine in the presence of sulfuric acid monohydrate and a small amount of iodine, at a temperature of about 60°, until approximately one bromine atom has been introduced into the anthanthrone molecule, and then cooling down and passing chlorine into the mixture, until approximately one chlorine atom has been introduced into the anthanthrone molecule.

6. As new products, vat dyestuffs corresponding probably to the formula:

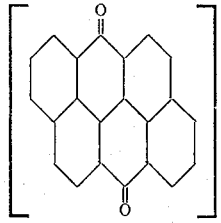

in which formula x is approximately the number 1, are when dry orange powders, difficultly soluble in organic solvents of a higher boiling point, easily soluble in concentrated sulfuric acid with a pure green color, and dyeing vegetable fibers from a violet vat orange shades of exceptional brightness and excellent fastness.

In testimony whereof we affix our signatures.

RICHARD HERZ.
WERNER ZERWECK.